April 4, 1967   J. S. CLARKE ETAL   3,312,076
DRIP PAN LNG TANK

Filed Jan. 18, 1966   2 Sheets-Sheet 1

INVENTORS
JAMES S. CLARKE
ARTHUR J. PALMER
BY
Donald F. Wohlers
ATTORNEY

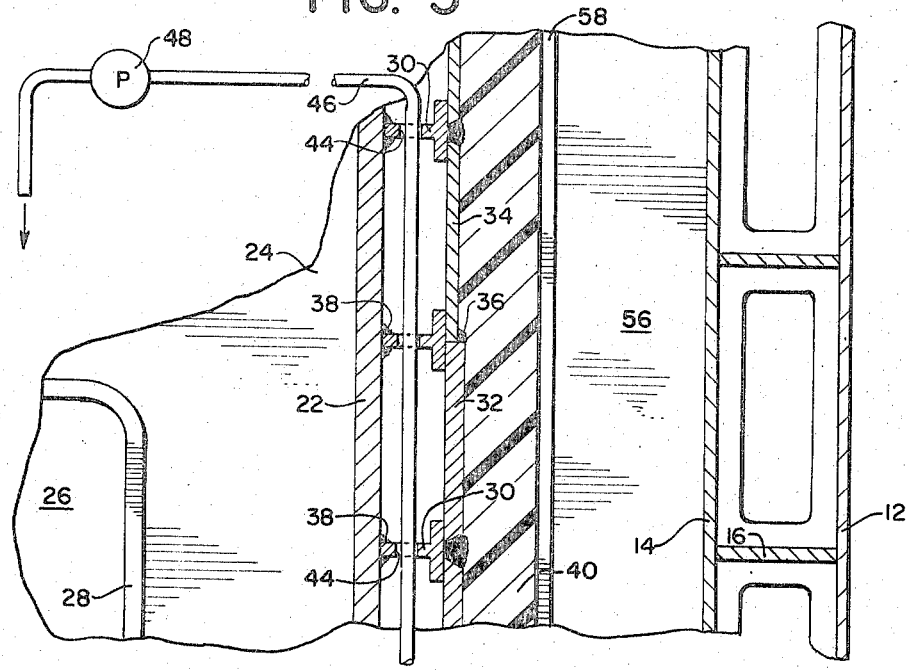

United States Patent Office 3,312,076
Patented Apr. 4, 1967

3,312,076
DRIP PAN LNG TANK
James S. Clarke, 419 Manor Ave., Cranford, N.J. 07016, and Arthur J. Palmer, 49 Moss Ave., Westfield, N.J. 07090
Filed Jan. 18, 1966, Ser. No. 521,273
3 Claims. (Cl. 62—55)

This invention relates in general to insulated containers and in particular to an improved minimum cost, maximum safety insulated container particularly suitable for the storage of liquefied gases at atmospheric pressure and cryogenic temperature in a tanker vessel.

In the transportation of liquefied gases at cryogenic temperatures and atmospheric pressure, and in particular of liquefied methane gas at −259° F. in tanker vessels made of ordinary carbon steel, it is one of the utmost importance that the liquefied gas be isolated from direct contact with the hull as embrittlement thereof would occur with a resulting fracture of the primary hull plate structure. One approach to the reduction of this risk has been to construct a fully redundant double wall tank having an inner and an outer liquid tight barrier, each of sufficient structural integrity to, by themselves, withstand the entire static and dynamic load of the liquid contents of the container. This technique of design approach provides a maximum degree of safety factor at a maximum cost in that esesntially two equivalent tank structures are provided, the outside of which is normally not required unless a rupture in the inner tank occurs.

An alternate philosophy design approach has also been to employ a cargo container of a single wall construction on the theory that any leak that may occur in the cargo tank per se will be due to a catastrophic type failure, such as a collision which most likely will rupture the primary ship's hull anyway. While such construction reduces the tank cost, it is at the expense of the safety provided by a second back-up tank system. Furthermore, such a system will not meet the safety regulations of all countries and increases the operators legal liability risks.

In accordance with the present invention, a liquefied gas container particularly suitable for use in a tanker vessel is provided which has essentially all of the reliability and redundancy on the aforedescribed double wall tank while retaining most of the lower cost and economical design of the single wall tank. In accordance with the invention, a primary barrier or inner wall of the container is of adequate structural design to retain the enclosed liquid. Spaced from and surrounding the primary inner container is a partially enveloping secondary wall. The outer or secondary barrier wall is of a thickness considerably thinner than the inner primary wall of the tank and includes an upper portion referred to as a spray shield and a lower portion referred to as a drip pan. The purpose of the secondary wall is not primarily as in the prior art to retain the entire static and dynamic load of the liquid contents should the inner wall develop a large rupture therethrough, but rather to provide an interim receptacle about the inner wall so that any small degree of seepage therethrough do to fatigue cracking, etc., may be collected and pumped from the space between the inner and outer walls. The arrangement of the invention is such that a container is produced having essentially all of the redundant safety features of the double wall tank design while having many of the economies of the single wall tank design because a minimum of expensive materials such as aluminum or stainless steel need be employed in the outer secondary barrier in view of its minimum wall thickness designed merely to deflect and temporarily retain any seepage through the primary wall. As in the prior art double wall tanks, the insulation may be applied exteriorly of the outer wall of the tank so that each of the tank walls operate at substantially the same temperature without a substantial thermal gradient therebetween. This location of the insulation eliminates the need for providing any elaborate differential expansion compensation means between the inner and outer walls which would otherwise be required if the insulation were between the walls.

Accordingly, it is a principal object of the present invention to provide an improved, low cost, double walled insulated cargo container.

Another object of the invention is to provide a cargo container having a secondary barrier partially surrounding the exterior thereof to provide deflection plate and temporary storage means for any seepage of liquids through the inner wall of the container and to provide a surface upon whose exterior insulation may be applied.

Another object of the invention it to provide an insulated liquefied gas container having a double wall wherein the space between the double wall includes means for removing any seepage of liquid from the interior of the container into said space.

A further object of the invention is to provide an insulated container for liquefied gas at cryogenic temperatures and atmospheric pressure which is simple in design, rugged in construction, safe in use and economical to manufacture.

These and other objects and advantages of the invention will become apparent and the invention will be fully understood from the following description and drawings in which:

FIG. 3 is an enlarged fragmentary cross-sectional view of a wall portion of FIG. 1 showing the means for removing liquid from the space between the two walls; and FIG. 4 is a top plan view of a container in accordance with the invention as it would be mounted between the port and starboard walls of the tanker vessel and between the fore and aft transverse cofferdam bulkheads of the cargo hold.

Figure 1:
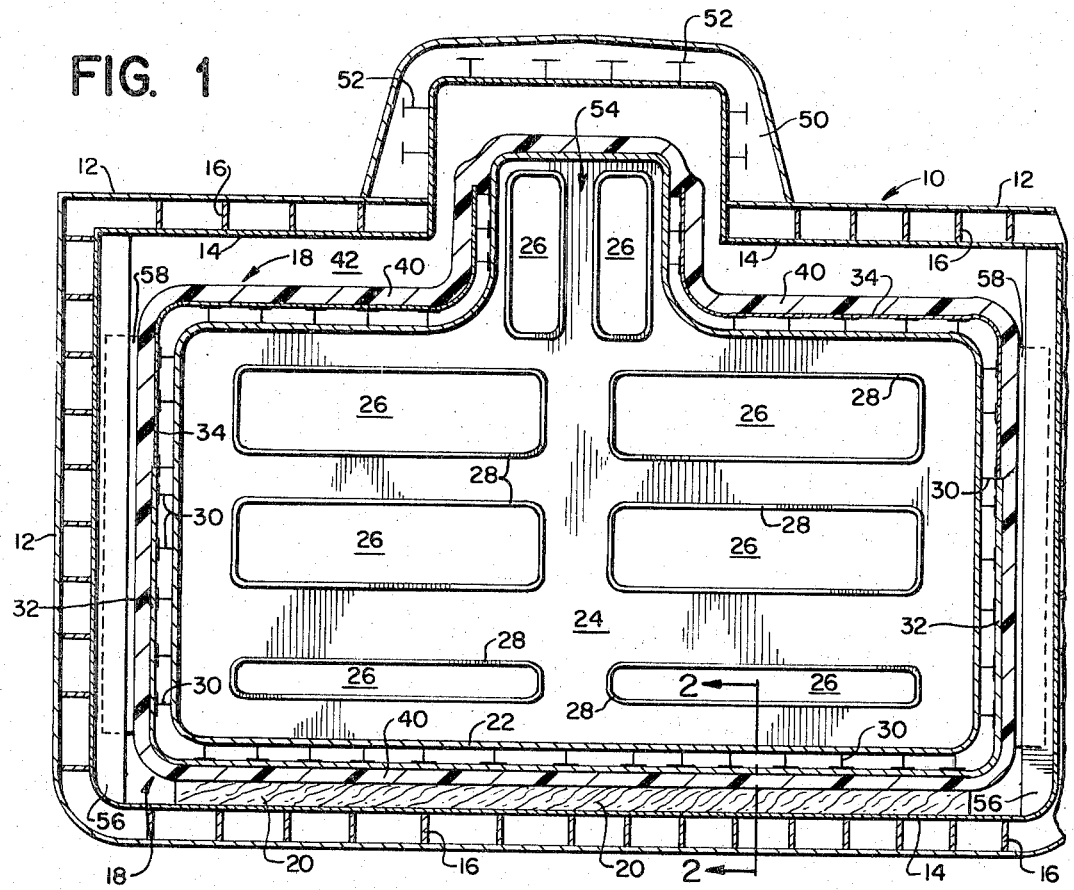
FIG. 1 is a cross-sectional view of the invention as it would be mounted in a typical double hull tanker vessel.
Figure 2:
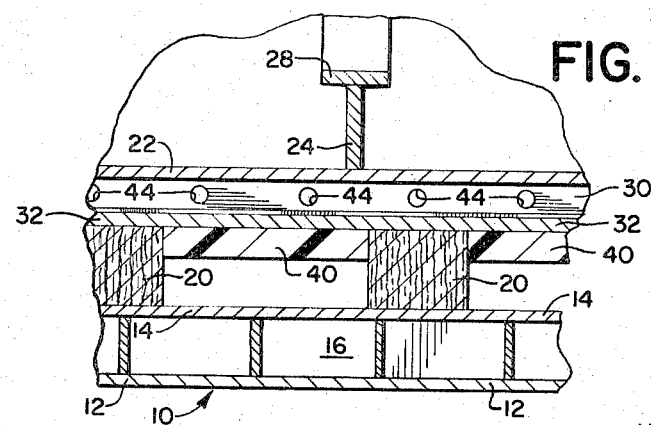
FIG. 2 is a fragmentary cross-sectional view taken along line 2—2 of FIG. 1 looking in the direction of the arrows.

Referring to the drawings in particular, the ship's hull 10 shown in schematic cross-section includes an outer steel hull portion 12 and an inner steel hull portion 14 maintained in spaced relationship with conventional structural plates 16. Within the hold of the hull thus defined is an insulated cargo container generally indicated at 18 supported at its bottom by a plurality of wooden bearing strips 20 running transversely of the longiutdinal axis of the ship (see FIGS. 1 and 2). The orientation of the grain in strips 20 is preferably in a vertical direction to obtain the maximum strength in compression.

The insulated cargo container 18 includes an inner wall or primary barrier 22 structurally supported by a plurality of internal web plates designated 24 which will be understood to run longitudinally as well as transversely within the confines of the inner wall 22. The web plates 24 include a plurality of cut-out portions 26 bounded by reinforcing flanges 28. Extending longitudinally along the outside of the primary tank 22 are a plurality of T-shaped stringers or spacers 30. The base of the T may be welded to the exterior of the primary tank wall 22 by a plurality of bead welds 38 (see FIG. 3). A secondary barrier or outer wall of the cargo container is weldably secured to the top of each of the T members 30. The outer wall of the container includes a lower drip pan portion designated 32 which is of a lesser predetermined thickness than the thickness of 22 but of greater thickness than the uper spray shield portion 34 of the secondary barrier. Each of the portions 32 and 34 are weldably secured to the T-shaped stringers 30 and are butt welded together at 36. In one form of the invention it has been found that a 3/16 inch thickness for the splash shield 34 is structurally adequate to deflect any hydraulic load at its height level downwardly into the lower portion of the space between the inner and outer walls. The thickness of the lower portion drip pan 32 in this same embodiment is selected to be 3/8 of an inch, which while adequate for containing its intended hydraulic load should a relatively small leak occur in the primary wall 22, is nevertheless substantially thinner than the thickness of the primary wall 22, which as previously described, is the only wall intended to take the normal dynamic and hydrostatic load of the liquid within the container.

A layer of insulation 40 is applied to the exterior surface of the outer wall portions 32 and 34 as well as to a small outer portion of the inner wall 22 at the uppermost trunk portion 54. The insulation 40 is preferably of a polyurethane foam which may be applied by spraying or, in the alternative, fixed to the container in a series of interlocking panels. An air space 42, which may be in the order of 3 feet or so, is provided between the outside of the insulation 40 and the interior wall 14 of the tanker hull. The air space 42 is of sufficient size to permit periodic visual inspection of the exterior of the insulation.

Referring to FIG. 3 in detail, it may be seen how each of the stringers 30 includes a plurality of apertures 44 which are preferably in vertical alignment and permit the downward passage therethrough of a conduit 46 having a lower end which will be understood to terminate in the lower portion of the space between the inner and outer walls of the tank. Conduit 46 is connected to a pump 48 so that any seepage of liquid from the interior of the container into the space between the inner and outer walls may be readily removed by the action of the pump 48.

Referring again to FIG. 1, the upper portion of the hull structure of the tanker is provided with a series of transverse external frame members 50 which extend over the raised trunk portion 54 of the ship's deck. Because the portion of the tanker hull in the trunk portion is only of a single thickness, its exterior is provided with a plurality of longitudinal T-shaped stiffener members 52 attached to the deck plates.

In FIG. 4, the manner in which the entire insulated cargo tank is secured and located to the hull structure may be seen. As previously pointed out, the static load of the insulated cargo container is transmitted to the ship's hull through the wooden bearing strips 20 at the bottom of the tank. The mounting of applicants' novel insulated cargo container is such to provide a minimum of transmission of the ship's normal distortion or "working" into the container per se in order to reduce the flexing of the container and to make it relatively independent of the load imposed on the ship's structure by external wave action. In the arrangement shown, the port and starboard, as well as fore and aft, walls of the exterior wall of the cargo container 18 are provided with a plurality of keys 58 which are rigidly mounted to the container. Each key cooperates with a pair of guide blocks 56 and is spaced therebetween. The port and starboard guide blocks 56 are secured in turn to the inner hull plate 14 while the fore and aft guide blocks 56 are secured to the normal transverse cofferdam bulkheads 60 of the ship's structure. In this manner of mounting of the cargo tank therefor, substantially the entire load of the cargo within the container is transmitted through the bearing strips 20 to the hull structure. The slip fits between the guide blocks 56 and the keys 58 about the four vertical sides of the cargo container to permit relative movement both vertically and horizontally between the hull structure and tanks without imparting the working stresses on the hull to the tank, but nevertheless, restrain the tank from shifting within the tanker hold.

While a specific embodiment of the invention has been shown and described in detail to illustrate the application of the inventive principles, it will be understood that the invention may be embodied otherwise without departing from such principles.

What is claimed is:
1. A container for liquefied gases at cryogenic temperatures for use in a tanker comprising; a primary tank of sufficient structural strength to contain the liquefied gas, said primary tank including internal structural web means extending across said primary tank fixed to the interior walls thereof; a larger secondary tank substantially similar in shape to said primary tank and partially surrounding said primary tank, thermally conductive structural means for maintaining said secondary tank in fixed spaced relation around said primary tank and for reducing the thermal gradient therebetween; said secondary tank including a lower drip pan portion of predetermined thickness less than the thickness of said primary tank yet sufficient to retain small quantities of the liquefied gases that may leak through said primary tank, and an upper spray shield portion of predetermined thickness less than the thickness of said drip pan portion for deflecting any seepage through an upper portion of said primary tank into said drip pan portion; pumping means for removing the liquefied gas from between the primary tank and said drip pan portion, and thermal insulation means applied externally to the entire outside of said secondary tank and to selected portions of said primary tank not enveloped by said secondary tank.

2. A container in accordance with claim 1 including keying means attached to said secondary tank cooperative with the structure of said tanker for permitting relative movement therebetween.

3. In combination, a tanker vessel having a cargo hold of predetermined shape and an insulated container for liquefied gases maintained at atmospheric pressure and cryogenic temperatures within said hold, said container comprising; a primary tank of sufficient structural strength to contain the liquefied gas, said primary tank including internal structural web means extending across said primary tank fixed to the interior walls thereof; a larger secondary tank substantially similar in shape to said primary tank and partially surrounding said primary tank, thermally conductive structural means for maintaining said secondary tank in fixed, spaced relation around said primary tank and for reducing the thermal gradient therebetween; said secondary tank including a lower drip pan portion of predetermnied thickness less than the thickness of said primary tank yet sufficient to retain small quantities of the liquefied gases that may leak through said primary tank, and an upper spray shield portion of a predetermined thickness less than the thickness of said drip pan portion for deflecting any seepage through an upper portion of said primary tank to said drip pan portion; pumping means for removing the liquefied gas from between the primary tank and said drip pan portion, thermal insulation means applied externally to the entire outside of said secondary tank and to selected portions of said primary tank not enveloped by said secondary tank, keying means attached to said secondary tank cooperative with the structure of said tanker for permitting relative movement therebetween, and a plurality of wooden bearing members between the bottom portion of said container and said cargo hold whereby the entire normal static load of said container and liquefied gas cargo is transmitted to the bottom of the hold of said vessel.

References Cited by the Examiner
UNITED STATES PATENTS

| | | | |
|---|---|---|---|
| 3,039,418 | 6/1962 | Versluis | 62—45 |
| 3,159,004 | 12/1964 | Keith | 62—45 |
| 3,229,473 | 1/1966 | Schumacher et al. | 62—55 |

LLOYD L. KING, *Primary Examiner.*